(12) United States Patent
Abraham et al.

(10) Patent No.: US 7,298,716 B2
(45) Date of Patent: Nov. 20, 2007

(54) CLUSTERING BASED LOAD ADAPTIVE SLEEPING PROTOCOL FOR AD HOC NETWORKS

(75) Inventors: Santosh P. Abraham, Keasbey, NJ (US); Mooi Choo Chuah, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 729 days.

(21) Appl. No.: 10/702,748

(22) Filed: Nov. 6, 2003

(65) Prior Publication Data

US 2005/0117530 A1  Jun. 2, 2005

(51) Int. Cl.
*H04B 7/212* (2006.01)

(52) U.S. Cl. ............... 370/321; 370/329; 370/331; 370/338; 455/41.2; 455/41.7; 455/450; 455/452.1; 455/553.1; 455/556.2

(58) Field of Classification Search ............... 455/41.1, 455/41.2, 41.3, 553.1, 556.2, 450–452.1, 455/507; 370/329, 331, 338, 321
See application file for complete search history.

(56) References Cited

U.S. PATENT DOCUMENTS

| | | | |
|---|---|---|---|
| 5,008,879 A * | 4/1991 | Fischer et al. | 370/401 |
| 6,041,046 A * | 3/2000 | Scott et al. | 370/319 |
| 7,009,991 B2 * | 3/2006 | Shachar et al. | 370/436 |
| 2002/0132603 A1 * | 9/2002 | Lindskog et al. | 455/343 |
| 2003/0210658 A1 * | 11/2003 | Hernandez et al. | 370/311 |

OTHER PUBLICATIONS

Ye et al. "Medium Access Control with Coordinated. Adaptive Sleeping for Wireless Sensor Networks"., Jan. 2003. USC/ISI.*
"Power-Saving Protocols for IEEE 802.11-Based Multi-Hop Ad Hoc Networks," Yu-Chee Tseng, et al., Proceedings of IEEE INFOCOM 2002.
"Medium Access Control with Coordinated, Adaptive Sleeping for Wireless Sensor Networks," Wei Ye, et al., USC/Information Sciences Institute, Jan. 2003.
"Multicluster, mobile, multimedia radio network," Mario Gerla et al., Wireless Networks 1 (1995), pp. 255-265.
"An Ad Hoc Network with Mobile Backbones," Kaixin Xu, et al., IEEE ICC 2002, New York, NY, Apr. 2002.

* cited by examiner

*Primary Examiner*—Steve M. D'Agosta

(57) ABSTRACT

A clustering based load adaptive sleeping protocol for ad hoc networks includes a plurality of nodes forming a cluster, where the nodes in the cluster are partitioned into n groups. This partitioning is performed based on the node ID (e.g. node_id modulo n). The cluster head transmits a beacon at fixed intervals. The beacon interval is divided into N slots, where N is a multiple of n. Node sleep/activation times are synchronized to the beacon interval slots. The node's group number is used to determine the slots within a beacon interval that a node begins it s sleep cycle. Therefore, no additional signaling is required between nodes to indicate sleep patterns. The sleeping time of each node may be increased when extended periods of inactivity are detected according to an adaptive procedure.

23 Claims, 5 Drawing Sheets

CLUSTERING BASED LOAD ADAPTIVE SLEEPING PROTOCOL FOR AD HOC NETWORKS

FIELD OF INVENTION

The present invention relates to network management. More specifically, the invention relates to adapting sleep intervals to traffic loads for nodes in ad hoc networks.

BACKGROUND OF INVENTION

An ad hoc network comprises portable wireless devices (nodes) that do not require fixed infrastructure. Wireless devices may become part of the network when they are located within the range of another node in the network. Each node in the ad hoc network may serve as a client, host, or router. The nodes are mobile devices, such as laptop computers, PDAs, among other mobile communication devices.

Currently, a number of wireless technologies exist for supporting ad hoc networks, including those operating under the Bluetooth, Infrared Data Association (IrDA), HiperLAN, and 802.11 standards. Potential applications of ad hoc networks illustratively include battlefield networks, emergency networks in disaster areas, among other network environments not requiring a stationary communications device, such as a base station for establishing communications between mobile devices.

The mobile nodes rely on battery power to operate, and consequently have power limitations. In order to extend the battery life for such wireless devices, various sleeping protocols have been implemented to force the nodes to turn off their radios when extended periods of communication inactivity are detected.

A node (host) in the active mode is fully powered, and thus may transmit and receive at any time. By contrast, a host operating in a power saving (sleep) mode, illustratively under the 802.11 standard, only wakes up periodically to check for possible incoming packets from other nodes. The nodes are grouped into clusters, where one of the nodes is selected as a cluster-head node, as conventionally known in the art. Periodically, the cluster-head transmits beacon frames spaced by a fixed beacon interval. Each beacon frame, delivers a traffic indication map (TIM), which contains ID's of those nodes with buffered unicast packets stored in the cluster-head. A node hearing its ID will stay awake for the remaining beacon interval.

Various sleeping protocols have been proposed to coordinate the sleep time of nodes. For example, one approach has been to impose a power saving mode to stay awake at for at least half of a beacon interval in each beacon interval. Accordingly, each node is awake long enough to ensure that neighboring nodes are aware of each others presence, such that buffered packets may be delivered, as required. However, since the clocks between the various nodes are not synchronized, this sleeping protocol requires that each host must stay in the active state more than half of the time, which is not very efficient for saving power.

Another proposed sleeping protocol is a "periodically-fully-awake-interval protocol. In this protocol, two types of beacon intervals are provided. The first interval is a low power interval protocol, where the length of the active window is reduced to the minimum, and the second interval is a fully-awake interval protocol, where the length of the active window is extended to the maximum. Since fully-awake intervals require a lot of power, they only appear periodically and are interleaved by low-power intervals. Although the energy required may be significantly reduced by using either of these two sleeping protocols, a node must still contend with other nodes to send a beacon in each beacon interval. Therefore, there is a need in the art for an improved sleeping protocol for ad hoc networks.

SUMMARY OF THE INVENTION

Accordingly, we have recognized that there is a need for a clustering based load adaptive sleeping protocol for ad hoc networks. In one embodiment, we eliminate the need for synchronization between users and do not require each user to transmit a beacon. Instead, we exploit the structure provided by node clustering to produce the framework for the protocol to operate. In a cluster, the nodes are partitioned into n groups. This partitioning is performed based on the node ID (e.g. node_id modulo n). The cluster head transmits a beacon at fixed intervals (BI). The beacon interval is divided into N slots, where N is a multiple of n. Node sleep/activation times are synchronized to the beacon interval slots. The node's group number is used to determine the slots within a beacon interval that a node begins it s sleep cycle. Therefore, no additional signaling is required between nodes to indicate sleep patterns. The sleeping time of each node may be increased when extended periods of inactivity are detected according to an adaptive procedure.

BRIEF DESCRIPTION OF THE DRAWINGS

The teachings of the present invention can be readily understood by considering the following detailed description in conjunction with the accompanying drawings, in which.

To facilitate understanding of the invention, identical reference numerals have been used, where possible, to designate identical elements that are common to the figures.

DETAILED DESCRIPTION OF THE INVENTION

The present invention provides a clustering based load adaptive sleeping protocol for ad hoc networks. In particular, the sleeping protocol of the present invention may be used by mobile devices (nodes) to decrease power consumption to thereby extend battery life of the device, while adapting the sleep intervals of a node to the traffic load of such node. The sleeping protocol of the present invention may be implemented in ad hoc networks illustratively operating under the Bluetooth, Infrared Data Association (IrDA), HiperLAN, and 802.11 standards, among other wireless standards.

Figure 1:
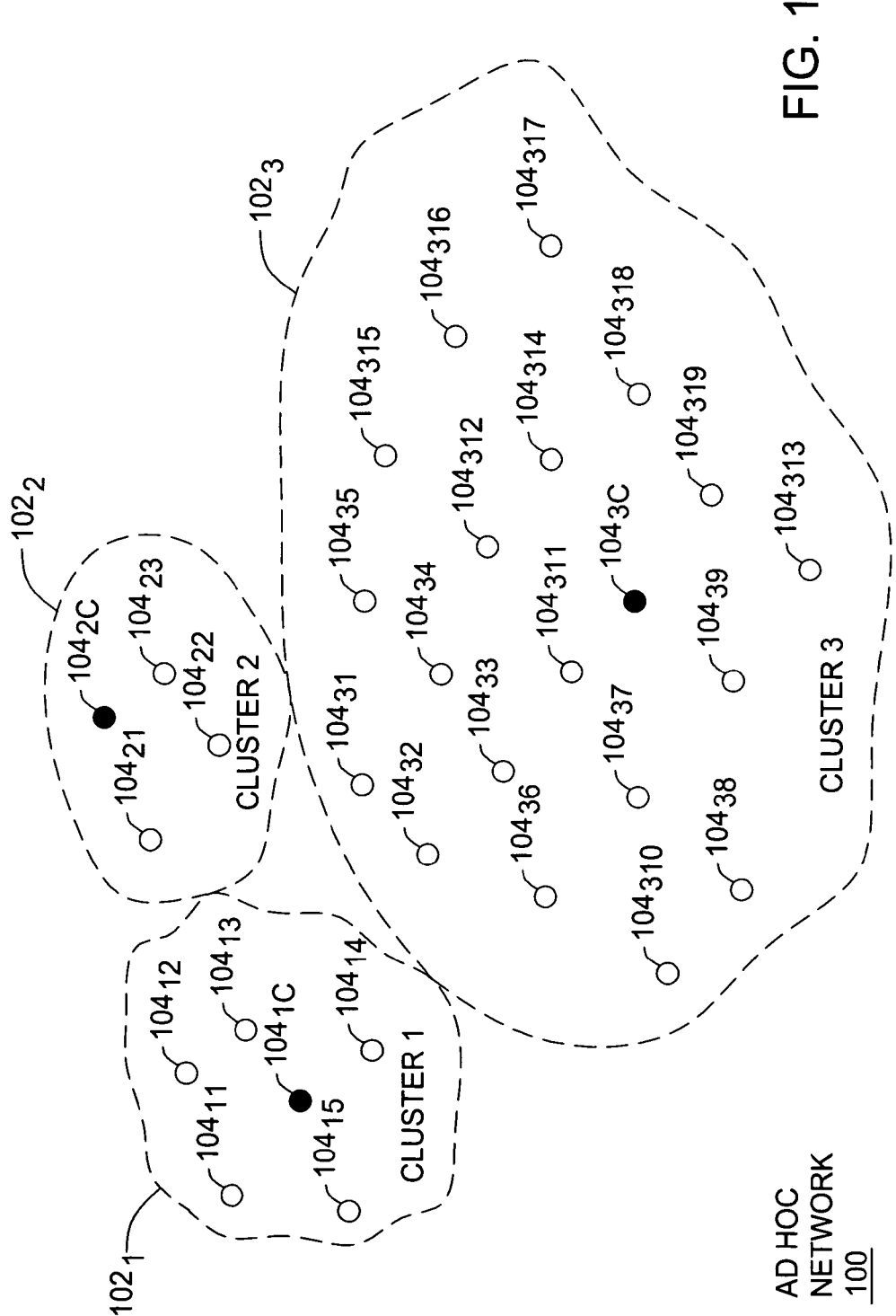
FIG. 1 depicts a schematic diagram of a plurality of clusters forming an ad hoc network environment suitable for understanding the present invention.

FIG. 1 depicts a schematic diagram of a plurality of clusters 102 forming an ad hoc network environment 100 suitable for understanding the present invention. The exemplary ad hoc network 100 comprises at least one cluster 102, where each cluster comprises at least two nodes 104, and where one of the at least two nodes 104 is designated as a cluster-head $104_C$. For example, in FIG. 1, three clusters $102_1$ through $102_3$ are illustratively shown, where the first cluster $102_1$ comprises six exemplary nodes $104_{11}$-$104_{15}$ and cluster-head $104_{1C}$ (drawn in black). Similarly, the second cluster $102_2$ comprises four exemplary nodes $104_{21}$-$104_{23}$ and cluster-head $104_{2C}$ (drawn in black), and the third cluster $102_3$ comprises 20 exemplary nodes $104_{31}$-$104_{319}$ and cluster-head $104_{3C}$ (drawn in black).

The nodes 104 are mobile communication devices, such as PDA's, laptops, among other mobile communication devices capable of transmitting and receiving packetized information. The sleeping protocol of the present invention is operable in homogeneous, as well as in heterogeneous ad hoc networks. That is, an ad hoc network 100 may comprise laptop devices, PDAs, among other types of mobile communication devices.

Clustering of nodes in an ad hoc network 100 is an efficient method for improving the performance of routing algorithms to exchange packetized information between the nodes. A cluster 102 is a subset of nodes 104, which can bi-directionally communicate with a cluster-head $104_C$, and in some instances, with each other. The nodes 104 typically communicate with one another via multi-hop routing techniques. The number of hops between nodes 104 depends on the network environment. Further, by defining the number of hops between nodes, the nodes 104 may then be grouped into their respective clusters. For example, if the multi-hop count is designated as two hops, then a node that is three hops away is grouped into another cluster 102. Thus, the formation of clusters 102 is dependent on the routing algorithms between nodes 104.

Each node 104 comprises a unique identifier. The unique identifier comprises the host ID (e.g., MAC ID) and a group ID. The group ID is associated with the cluster for which the node is a member. Thus, the host ID of a node 104 remains constant, while the group ID may change in instances where the node 104 moves from one cluster to another cluster 102.

The cluster-heads $104_C$ of each cluster 102 serve as a regional broadcast node, and as a local coordinator to enhance channel throughput. Selection of a cluster-head $104_c$ is conventionally known. For example, one technique to determine the cluster-head $104_C$ is based on the node identifiers. Since each node has a unique ID, a node illustratively having the lowest (or highest) ID among its neighboring nodes may be selected as a cluster-head $104_C$. Another technique includes electing a node as a cluster-head $104_C$ if it is the most highly connected node. Each node 104 broadcasts a list of nodes that it can hear, including itself. A node 104 is elected as a cluster-head $104_C$ if it is the most highly connected node of all its uncovered neighbor nodes, where a node 104 that has not elected its cluster-head $104_C$ yet is considered an uncovered node. Clusters 102 provide a hierarchical structure for the ad hoc network 100. This hierarchical structure may be exploited to obtain a distributed protocol for co-coordinating transitioning of the nodes from an active state to a sleep state, and vice versa.

One benefit of the ad hoc network 100 is that the nodes 104 may communicate with each other, illustratively by sending packetized information, such as IP packets to each other. In one embodiment, all the nodes 104 in each cluster 102 are assigned the same subnet address. When a node (e.g., node $104_{11}$) of a first cluster (i.e., first cluster $102_1$) requests a routing path for communicating (i.e., sending IP packets) with a node (e.g., node $104_{319}$) of another cluster (i.e., third cluster $102_3$), the requesting node $104_{11}$ broadcasts a routing request. Since the broadcasted routing address has a subnet address differing from its own subnet address, the first cluster-head $104_{1C}$ rebroadcasts the request to the third cluster-head $104_{3C}$, which has the same subnet address of the requested node $104_{319}$. The third cluster-head $104_{3C}$ responds to the rebroadcasted request from the first cluster-head $104_{1C}$, and provides the routing information, which is subsequently sent to the requesting node $104_{11}$. Accordingly, since the number of cluster-heads $104_C$ in the ad hoc network 100 represents a small fraction of the total number of nodes 104, cluster based routing incurs fewer rout exchange messages. Moreover, inter-connections between the cluster-heads $104_C$ may be provided via higher power links or gateway nodes.

Figure 2:
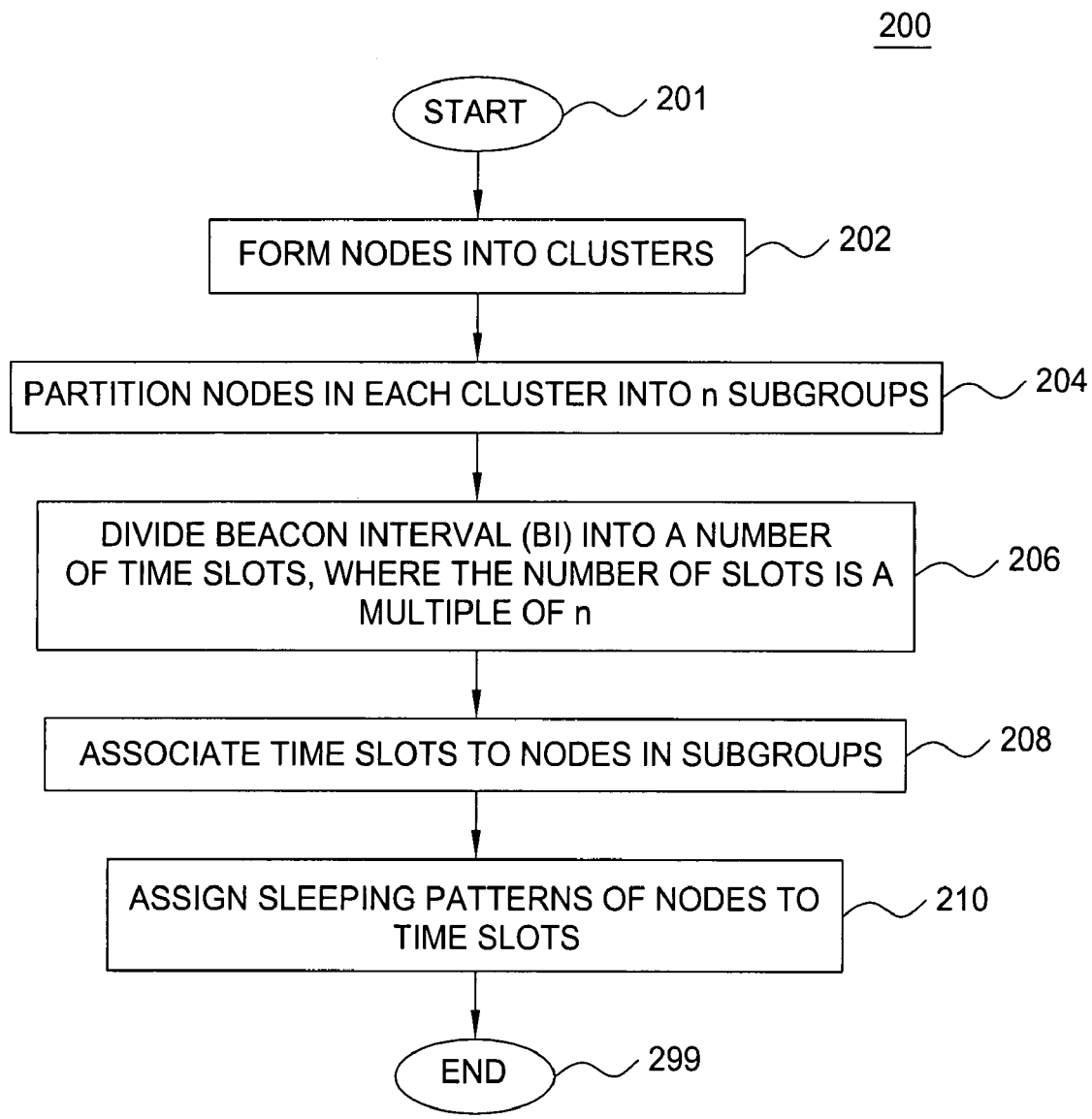
FIG. 2 depicts a flow diagram of a method of providing a cluster based load adaptive sleeping protocol.
Figure 3:
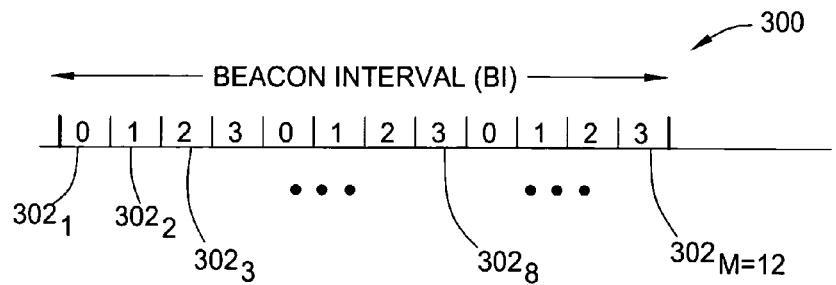
FIG. 3 depicts a graphical representation of a beacon interval suitable for understanding the present invention.

FIG. 2 depicts a flow diagram of a method 200 of providing a cluster based load adaptive sleeping protocol. FIG. 3 depicts a graphical representation of a beacon interval suitable for understanding the present invention. The graphical representation of FIG. 3 should be viewed in conjunction with the flow diagram of FIG. 2. Referring to FIG. 2, the method 200 starts at step 201 and proceeds to optional step 202, where one or more clusters are formed in a conventionally known manner, such as discussed above. It is noted that the optional clustering of the nodes 104 is based on the number of nodes in the network 100. For example, if there are only a few nodes 104 in the network that all comply with the multi-hop algorithm for the network, then clustering of the nodes is not necessary and optional step 202 is not required. However, one of the nodes will be designated as a "cluster-head" to broadcast a beacon signal, as discussed below in further detail.

At step 204, the nodes 104 are partitioned into n-subgroups, where n is an integer greater than one. The nodes 104 are partitioned into subgroups to enable a node to determine the partition of any other node. In one embodiment, each node is assigned to a subgroup based on the node's unique host ID by using a node_id modulo n technique. For example, exemplary cluster 3 $102_3$ contains 20 nodes, and if n=4, then five nodes are assigned to each subgroup n in cluster 3 $102_3$. Accordingly, subgroup 0 includes nodes $104_{31}$, $104_{35}$, $104_{39}$, $104_{313}$, $104_{317}$; subgroup 1 includes nodes $104_{32}$, $104_{36}$, $104_{310}$, $104_{314}$, $104_{318}$; subgroup 2 includes nodes $104_{33}$, $104_{37}$, $104_{311}$, $104_{315}$, $104_{319}$; and subgroup 3 includes nodes $104_{34}$, $104_{38}$, $104_{312}$, $104_{316}$, $104_{320}$.

Once the optional clusters 102 have been formed and the nodes have been partitioned into n-subgroups, the cluster head $104_C$ transmits a beacon at fixed intervals. At step 206, the beacon interval (BI) is divided into a number of time slots whose duration is chosen based on the network topology, traffic density, and latency requirements. Referring to FIG. 3, a graphical representation of an exemplary beacon interval 300 is shown. The beacon interval 300 comprises a plurality of time slots 302, where each time slot 302 is associated with the n-subgroups of nodes formed in step 204. The beacon interval 300 is selected such that the number of time slots 302 within the beacon interval is a multiple of n. Each time slot 102 in the beacon interval 300 is illustratively marked with a number 0, . . . n−1, as shown in FIG. 2. The time slots that are marked with a number m<n, where m is an integer less than n, are called m-slots. The method 200 then proceeds to step 208.

At step 208, the time slots are associated to the nodes 104 in each subgroup. Referring to FIG. 3, the nodes in subgroup m are called m-nodes. Thus, each time slot 302 is associated with a corresponding subgroup of nodes 104 in the cluster(s) 102. It is noted that in FIG. 3, node subgroups illustratively are shown to occur three times per beacon interval 300. Specifically, the nodes 104 in each subgroup only hear one beacon per beacon interval 300, but the nodes 104 of the subgroup illustratively wake up three times per beacon interval in an instance where their sleeping interval is equal to four time slots 302.

At step 210, sleeping patterns are assigned to each subgroup of nodes corresponding to one or more time slots. The beacon interval time slots 302 are used to obtain a distributed algorithm that coordinates the sleeping patterns of the nodes 104 in each subgroup. In one embodiment, m-nodes begin a sleep cycle at time slots marked (m+1) modulo n. The sleep intervals are selected such that the waking times at an m-node occur in an m-slot. For example, those nodes having host ID's corresponding to subgroup 1, such nodes transition into the awake mode of operation whenever time slot 1 begins, and transition into the sleep mode when time slot 2 begins. The nodes in subgroup 1 remain in sleep mode for the remaining time slots 3 and 0, until time slot 1 reoccurs and the node goes into awake mode. Thus, the node is in the sleep state for n−1 time slots. Referring to FIG. 3, the nodes in each subgroup 1 are awake for three time slots per beacon interval and asleep for nine time slots. Further, each node in subgroup 1 is awake for one time slot, followed by entering the sleep mode for three successive time slots 302, before waking up again. The same analysis is applicable for the nodes of the other subgroups. Accordingly, for exemplary cluster 3 102$_3$, which has twenty nodes, there are five nodes that are awake and fifteen nodes that are in sleep mode at any given time slot 302. The method 200 then proceeds to step 299, where the method 200 ends.

It is noted that the number of times a subgroup of nodes is awake and asleep per beacon interval is dependent on the network topology, traffic, and latency requirements. For example, if traffic between nodes is light and latency requirements are not stringent, then the total sleeping interval may be increased. For example, a node in subgroup 1 begins a sleep cycle at slot 302$_3$, it then remains in the sleep state for the slots 302$_4$, 302$_5$, . . . , 302$_9$ and wakes up at slot 302$_{10}$. The sleeping time is thus increased by n.

An advantage of dividing each beacon interval 300 into a plurality of time slots 302$_m$ is that any node in the network 100 will know the waking times of another node, if the other nodes subgroup_id and host_id is known. For example, a node in subgroup 0 may determine the waking time of a node in any of the subgroups 1-3, as long as the node in subgroup 0 knows the subgroup_id and host_id of a particular node it wishes to communicate with.

It is noted that clock synchronization between the nodes is not required, since the nodes all enter the sleep/awake modes based on receiving the broadcast beacon signal from the cluster-head 104$_C$. Accordingly, a node will always know when it may communicate with another node based on its time slot, and the algorithm defining the awake and sleep modes during the beacon interval.

Figure 4:
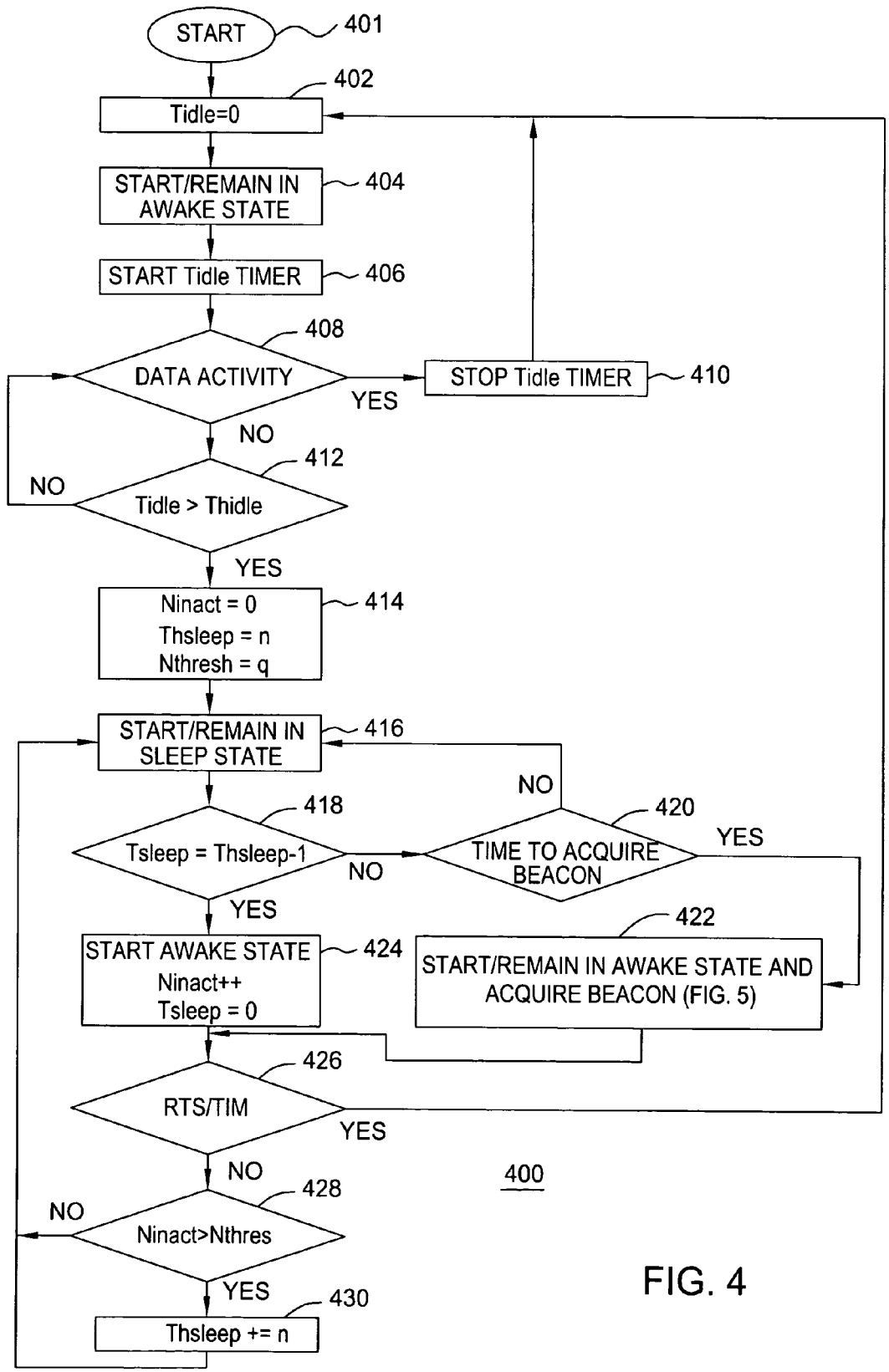
FIG. 4 depicts a flow diagram of a method of adaptively adjusting a sleeping time interval of a node.

FIG. 4 depicts a flow diagram of a method 400 of adaptively adjusting a sleeping time interval of a node 104. The method 400 of FIG. 4 may be executed by each node to help improve its battery life. It is noted that method 400 is executed after the clustering process is completed, and the nodes remain active until they become part of the cluster 102. The method is based on traffic patterns for each node 104.

Specifically, if a node 104 has been idle for some predetermined period (i.e., no transmission, receipt, or forwarding of packets), or does not receive any request to send (RTS) messages and/or traffic indication maps (TIM) during the one slot after waking up from the sleep state, the sleep interval for such node may be extended. It is noted that RTS messages are used between nodes to initiate communications therebetween. For example, if a first node sends a RTS message to a second node, the second node must respond with a clear to send (CTS) message prior to the first node sending any packetized information. Further, TIM messages are used to inform nodes that they should transition into an active state for an extended period of time in order to receive data.

The method 400 starts at step 401, and proceeds to step 402, where the time that a node 104 is idle (Tidle) is set to zero (Tidle=0). At step 404, the node 104 receives the beacon signal from its respective cluster-head 104$_C$ and transitions or remains in its awake state, as discussed above with respect to FIGS. 2 and 3. During the awake state, the node may be active, i.e., sending, receiving, and or forwarding packets and/or in an idle state, where the node is awake, but not sending, receiving, and or forwarding packets. For example, if the node 104$_{37}$ is part of a second subgroup of cluster 3 102$_3$, then the node 104$_{37}$ goes into its awake state illustratively during time slot 2 of the beacon interval 300. Once in the awake state, the node 104$_{37}$ may operate in the active state as long as the node 104$_{37}$ is sending, receiving, and/or forwarding packetized information. Once the node 104$_{37}$ stops sending, receiving, and/or forwarding packetized information, the node 104$_{37}$ becomes idle for some time period, until the node either becomes active (is sends, receives, and/or forwards packetized information) or goes into the sleep state.

At step 406, an idle timer Tidle is set to zero and begins counting the time the node is in the idle state. At step 408, a query is made whether data activity has initiated. If the query at step 408 is affirmatively answered, then the method proceeds to step 410. At step 410, the idle timer Tidle is stopped, and the method 400 proceeds to step 402, where the idle time is reset to zero, since the node is now in the active state. If at step 408, the query is negatively answered, then the method 400 proceeds to step 412.

At step 412, a query is made whether the idle time Tidle of the node has exceeded a predetermined threshold for idle time (Thidle). The threshold time Thidle is set to a time value based on various network parameters, such as size of network (e.g., number of nodes), type of network (e.g., 802.11(a), 802.11(b), 802.11(g), Bluetooth, which have different bit rates, how much power is desired to be saved by the sleeping protocol, among other network conditions. It is noted that the smaller the threshold value, the quicker the node will transition into a sleep mode of operation. That is, the protocol schedules the node for transition to the sleep state at the next valid sleep start time. It is further noted that the idle threshold value Thidle may be set using variables associated with either number of slots 302 in the beacon interval 300, or as a set time value.

Referring to FIG. 1, if node 104$_{37}$ is awake at the second slot 302$_3$ and Thidle is illustratively set for a duration equivalent to three time slots, then, the node 104$_{37}$ will go into sleep mode at time slot 302$_8$, which is the next valid sleep start time. Similarly, if the Thidle is illustratively set for a duration greater than the beacon interval 300, the node $104_{37}$ will go into sleep mode at the first valid sleep start time (e.g., time slot 3) of a subsequent beacon interval 300. Alternatively, Thidle may be set to some specific time (e.g., 50 milliseconds).

If at step 412, the idle time Tidle has not exceeded the idle time threshold Thidle (and has not returned to an active state), then the method 400 returns to step 408, until at such time at step 412, the idle time Tidle has exceeded the idle time threshold Thidle. The method 400 then proceeds to step 414.

At step 414, an inactive indicator (Ninac), which counts the number of times a node has woken up and has not received a request to send (RTS) and/or TIMs sent to it, is set to zero (Ninac=0). Additionally, an inactive indicator Nthresh) is set to q (Nthresh=q), which is associated with the number of times the maximum sleeping period has occurred. Further, at step 414, the maximum sleep time threshold (Thsleep) is initially set to n (Thsleep=n), where n equals the subgroups of nodes. It is noted that the value n may change according to the principles of the invention, as discussed in further detail below with respect to steps 424-430.

Once the variables and counter are set at step 414, the method 400 proceeds to step 416 where the node 104 begins the sleep state. That is, the idle time Tidle has exceeded the idle time threshold Thidle. Recall that in FIG. 3, four exemplary subgroups were formed via method 200 of FIG. 2, and that a node illustratively sleeps for three time slots and transitions to the awake mode at the fourth time slot. Thus, in the present example, n equals four (e.g., n=4) and the node $104_{37}$ will illustratively go into sleep mode at time slot 3 and awaken four time slots later, when time slot 2 occurs.

At step 418, a determination is made whether it is time for the node 104 to awaken. That is, if Tsleep=Thsleep-1, then the method 400 proceeds to step 424, as discussed below in further detail. If the time in the sleep state (Tsleep) does not exceed the maximum sleep time threshold less one slot (Thsleep-1), then the method 400 proceeds to step 420.

At step 420, a determination is made as to whether it is time to acquire the beacon signal. In particular, the node may need to acquire the beacon signal because extended sleeping intervals may cause a node to lose the timing synchronization with the cluster head due to clock drifts. It is noted that a node cannot receive the beacon from the cluster head when it is in the sleep mode. If at step 420, it is not time to acquire a new beacon signal, then the method 400 returns to step 416, where the node remains in the sleep mode. However, if at step 420, a new beacon signal is required, then the method 400 proceeds to step 422, where a beacon acquisition procedure is executed. In particular, the node transitions to the awake mode and waits until the beacon is heard from the cluster head. On hearing the beacon, the node can correct the error (if any) in the synchronization between the node and cluster head. Once the beacon has been acquired, the method 400 then proceeds to step 426.

Referring to step 418, if the time in the sleep state (Tsleep) does exceed the maximum sleep time threshold (Thsleep-1), then the method 400 proceeds to step 424. That is, using the above example, after the node $104_{37}$ has been in the sleep mode for three time slots, the node $104_{37}$ then transitions to the awake state beginning in the fourth time slot. Referring to FIG. 3, if the node is awake in slot 2 $302_7$, the node will transition into the sleep mode at time slot $302_8$ and remain in the sleep state until time slot $302_{12}$, which is n=4 slots thereafter. Once the node transitions to the awake state, Tsleep is reset to zero (Tsleep=0).

In one embodiment, the counter Ninac counts the number of times the node has awoken from the sleep state and remained inactive. That is, the node transitions back and forth between the awake and sleep states at the appropriate slot, as discussed above with respect to FIG. 3, and the counter Ninac counts the number of times the node remained inactive (idle) in the awake mode. For example, if node $104_{37}$ is awake at the second slot $302_3$ and node $104_{37}$ wakes up two more times during the beacon interval 300 without becoming active (i.e., the node stays idle), then Ninac is incremented by two (2).

More specifically, if at anytime during the course of alternating between the sleep and awake modes, at step 426 the node receives at least one RTS or TIM message, then the method 400 returns to step 402, where the idle time Tidle is reset to zero, and the node 104 remains in an active state (step 404), as discussed above. Alternatively, if there are no RTS or TIM messages during the time slots that the node is awake, the method 400 proceeds to step 428.

At step 428 a determination is made whether the count of Ninac has exceeded the predetermined threshold Nthresh. If the count of Ninac has not exceeded the predetermined threshold Nthresh, then the method 400 returns to step 416 where the node remains in the sleep state. However, if at step 428 the count of Ninac has exceeded the predetermined threshold Nthresh, then the method 400 proceeds to step 430 where the sleep threshold Thsleep is incremented by a value of n. For example, where n was previously set to four time slots, n is now increased to eight time slots. The method 400 proceeds to step 416, where the node 104 remains in the sleep state.

The exemplary sleeping protocol implemented via method 400 helps improve the battery life at a node by adapting the sleep time to the traffic arrival/departure profile of the node. Specifically, if no RTS/TIM messages arrive at the node during the time slot when the node is awaken from the sleep state, the counter Ninac is incremented. The counter Ninac continues to increment each time the node transitions to the awake state and no RTS/TIM messages arrive. In other word, the node cumulatively monitors the number of times the node cycles through the sleep/awake states without receiving any messages. When the counter Ninac exceeds the preset threshold Nthresh, the sleep threshold Thsleep is increased to allow the node to remain in the sleep state for a longer period, thereby helping increase the battery life of the node. That is, since the node has remained idle in its awake state for some predefined period, it may be assumed that it will continue to remain idle for at least such subsequent periods. Such assumption is based on the traffic patterns of the node, which are monitored by tracking the absence of RTS/TIM messages received by the node (step 420), which reflect the amount of node traffic. Accordingly, the sleep state of a node may be increased as a function of the absence of the RTS/TIM messages received by the node.

If a node 104 has very low traffic arriving or departing therefrom, the sleeping protocol of FIG. 4 may cause the sleep times to exceed several beacon intervals. Since the clocks of the nodes may be subject to drifting over some period of time, the nodes may lose synchronization with the beacon signal. Accordingly, the nodes will not wake at the proper time and those nodes may fail to timely receive RTS/TIM messages from the other nodes in the cluster 102. To prevent the nodes from becoming unsynchronized with the beacon signal, in one embodiment of the invention, a method is provided to keep the nodes synchronized with the beacon signal from the cluster-head $104_C$.

Figure 5:
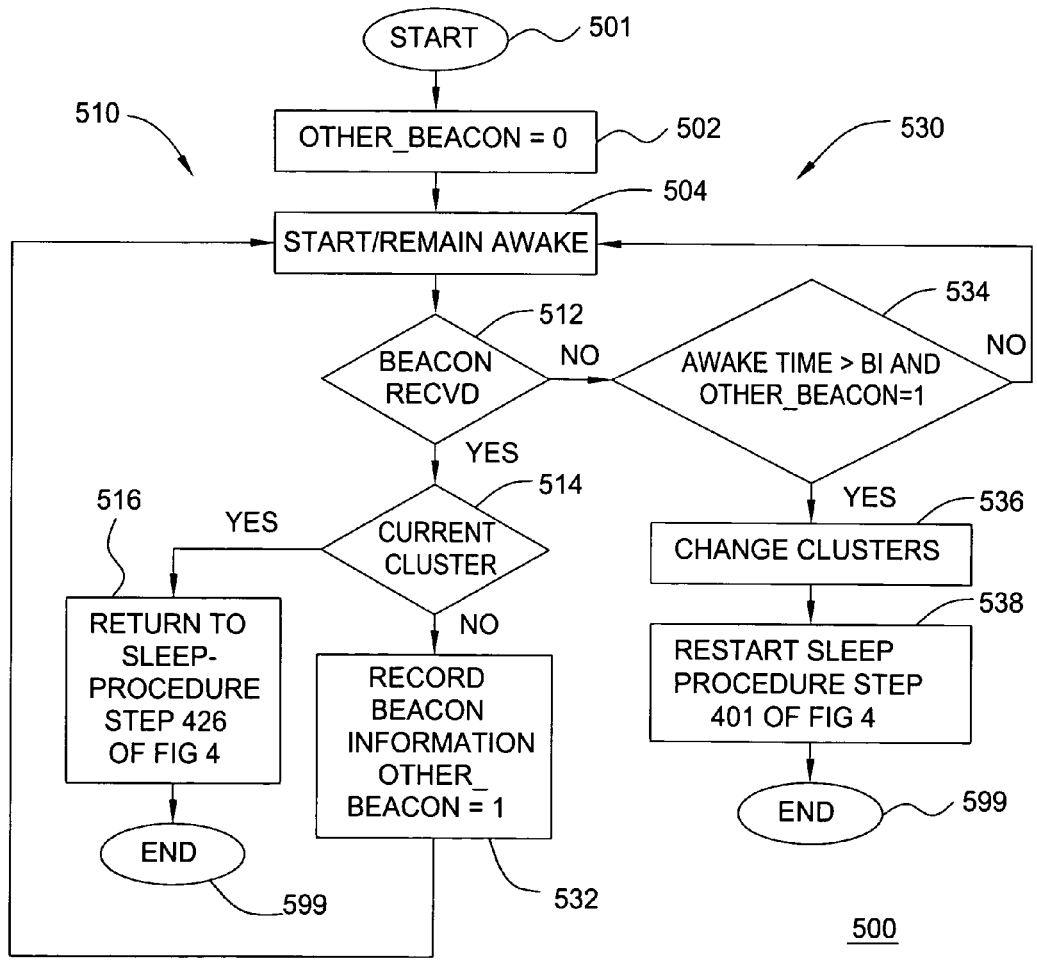
FIG. 5 depicts a flow diagram of a method for synchronizing a node with a beacon signal when associating with a cluster.

FIG. 5 depicts a flow diagram of a method 500 for synchronizing a node 104 with a beacon signal when associating with a cluster 102. The method 500 of FIG. 5 conveniently combines two aspects of the present invention into a single flow diagram.

In particular, one inventive aspect is that the node transitions into the awake state if the node has been in the sleep mode past a predetermined number of beacon intervals, as provided by steps 512 through 516 of a first sub-method 510. A second inventive aspect is that the node may change its cluster in an instance where the node loses connectivity with its current cluster-head $104_C$ (e.g., moves into another cluster), provided by step 532 through 538 of a second sub-method 530.

Method 500 begins at step 501, and proceeds to step 502 where a variable "Other_Beacon" is set to zero (Other_Beacon=0). That is, the node is associated with its current or last heard beacon signal, and is not receiving a second (new) beacon signal from another cluster-head. The method 500 then proceeds to step 504. At step 504, the node remains in the awake state until it receives a beacon signal. That is, the node is in a time slot corresponding to its awake state, as illustratively shown in FIG. 3. At step 512, the node determines whether the beacon signal is being received during its awake state. That is, method 400 of FIG. 4 is executed to acquire the beacon signal (steps 402-418), as discussed above. If at step 512, the beacon signal is not acquired, then the method 500 returns to step 504 and remains in the awake until a beacon signal is acquired.

It is noted that FIG. 5 depicts a query being performed at step 534. Specifically, if at step 512, the beacon signal is not received (i.e., the determination is answered negatively), then the method 500 proceeds to step 534, where a determination is made whether the node has been awake long enough to acquire either the current beacon signal or a new beacon signal (i.e., the awake time of the node is greater than the beacon interval (Awake time>BI) and a beacon signal from a different cluster-head has been received (Other_Beacon=1)). In this instance, since there is no other beacon signal being received by the node (i.e., Other_Beacon=0), the determination at step 534 is answered negatively, and the method proceeds to step 504, where the node remains in the awake state until a beacon signal is acquired. More specifically, step 534 is only applicable in instances where the node has received a beacon signal from a second source, as discussed below with respect to steps 532-538.

Referring to step 512, if the determination is affirmatively answered (i.e., the beacon signal initially/currently associated with the node is received), then the method 500 proceeds to step 514. At step 514, a determination is made whether the beacon signal is from the cluster 102 the node is currently associated. If the determination is affirmatively answered, then at step 516 the node returns to step 426 of the sleep procedure of FIG. 4, and the method 500 ends at step 599. If at step 514 the determination is negatively answered, i.e., the beacon received is from a different cluster, at step 532 the relevant information of the acquired beacon is recorded (i.e., Other_Beacon=1). The method 500 proceeds to step 504 where the node remains in the awake state, and then proceeds to step 512 to determine whether the new beacon signal has been received by the node.

As mentioned above, a second aspect of the invention is to allow the node to be mobile, and still communicate with various nodes, even if such nodes are members of a different cluster. That is, the node may move out of range of a cluster-head of its current cluster, yet still receive beacon signals from one or more respective cluster-heads of other clusters.

Referring to step 514 of FIG. 5, if a determination is made that the beacon received is not from the current cluster (i.e., the last cluster that a beacon signal was received from) then the method 500 proceeds to step 532 of the second sleep protocol 530. At step 532, the node 104 records the beacon signal information acquired from other cluster-heads $104_C$. For example, referring to FIG. 1, if node $104_{13}$ of the first cluster $102_1$ moves out of range of its respective cluster-head $104_{1C}$ towards cluster 2 $102_2$ and cluster 3 $102_3$, the node $104_{13}$ may illustratively receive a beacon signal respectively from cluster-head $104_{2C}$ of cluster 2 $102_2$ and/or cluster-head $104_{3C}$ of cluster 3 $102_3$. Accordingly, at step 532, node $104_{13}$ maps the acquired beacon signals with their respective clusters 102. The method 500 proceeds to step 504, where the node remains in the awake mode.

At step 512, if the second (new) beacon signal (Other_Beacon=1) is not received, then at step 534, a determination is made whether the node has remained awake long enough to acquire the second beacon signal. If not, the method 500 proceeds to step 504 and stays awake until at step 534, the beacon signal of the second cluster has been received. That is, the method 500 proceeds to step 504 to provide additional time to acquire the new beacon signal. Thus, step 534 ensures that the node stays awake long enough (at least on beacon interval) to acquire the current/original beacon signal or a new beacon signal from another cluster-head.

If the determination at step 534 is affirmatively answered, then the node has (i) stayed awake greater than one beacon interval, and (ii) has received a beacon signal from a new cluster-head. Accordingly, the method 500 proceeds to step 536, where the node changes to the cluster associated with the newly acquired beacon signal. That is, the node changes its group_id (while the host_id always remains the same), and joins a subgroup of the second cluster having the same subgroup number. For example, if node $104_{13}$ is assigned to subgroup 3 of the first cluster $102_1$, and moves into the second cluster $102_2$, the awake and sleep time slots for node $104_{13}$ will also correspond to the awake and sleep time slots of the nodes assigned to subgroup 3 of the second cluster $102_1$. Accordingly, the node may roam between clusters in a seamless manner without having to send out beacon signals to other nodes.

In particular, node sleep/activation times are synchronized to the beacon interval slots, where the node's group number is used to determine the slots within a beacon interval that a node begins its sleep cycle. Therefore, no additional signaling is required between nodes to indicate sleep patterns. The method 500 proceeds to step 538, where the node restarts the sleep procedure in the new cluster per method 400 of FIG. 4.

It is noted that the node may choose a cluster from among several respective beacon signals acquired during the awake state, as conventionally known in the art. For example, the node may determine signal strength of the beacon signal and select the cluster associated with the strongest beacon signal, among other conventional selection techniques. The method 500 then proceeds to step 599, where the method 500 ends.

Figure 6:
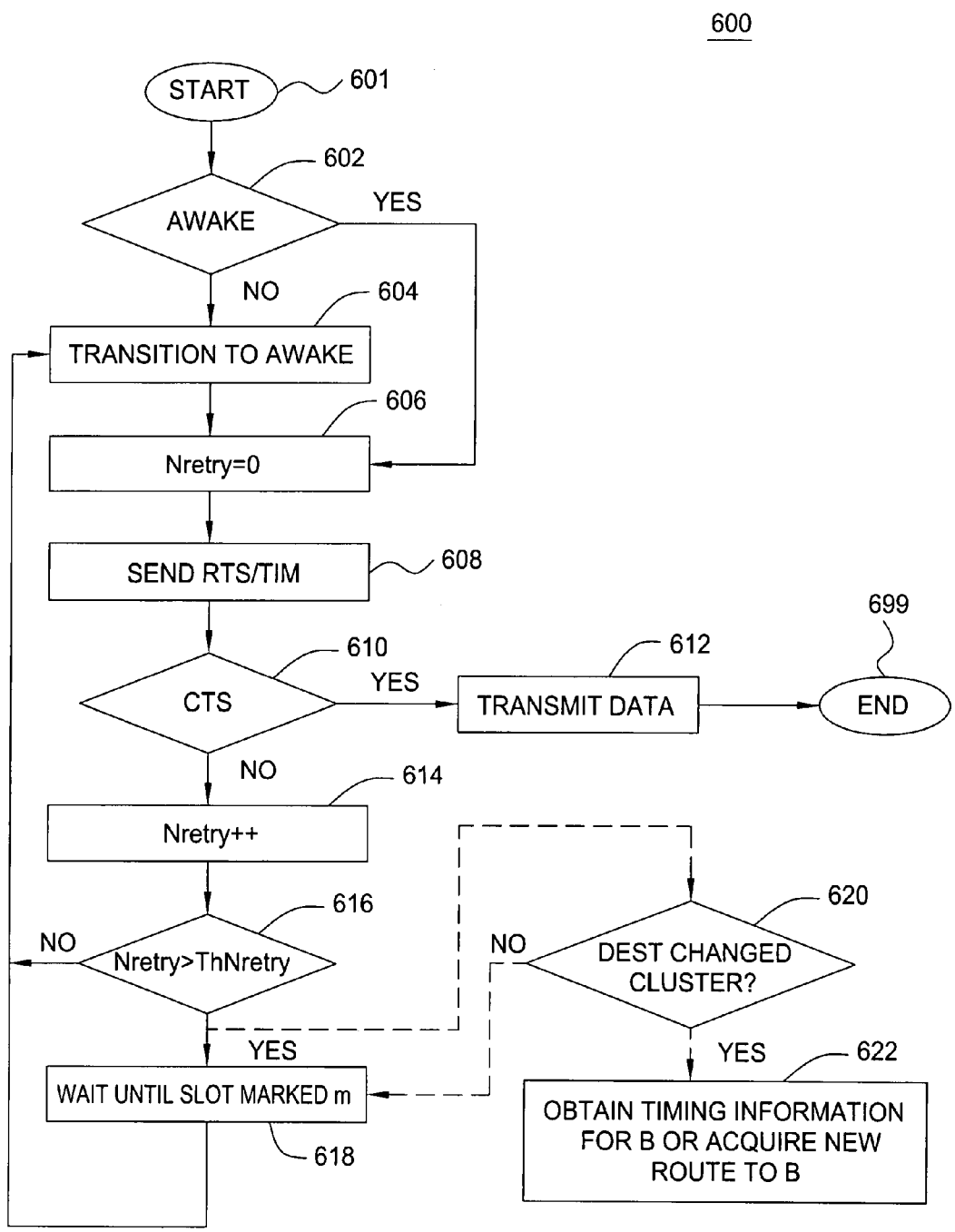
FIG. 6 depicts a flow diagram of a method for transmitting data between nodes.

FIG. 6 depicts a flow diagram of a method 600 for transmitting data between nodes 104. Method 600 may be executed when a first node (e.g., node A) has data to send to an m-node (e.g., node B). The transmission may be from data generated at node A or may be data forwarded through node A to node B.

The method 600 begins at step 601 and proceeds to step 602, where a determination is made whether the sending node (node A) is awake. If the sending node is not awake, at step 604, the sending node transitions to an awake state. Once awake, the sending node sets a counter Nretry to zero (Nretry=0). The counter Nretry is used to count the number of times attempts to communicate with an other node are made. It is noted that at step 602, if the sending node A is in the active state, then the method 600 proceeds directly to step 606 to set the counter Nretry to zero. The method 600 then proceeds to step 608.

As soon as the data is available, at step 608 the sending node A sends a request to send (RTS) or traffic indication map (TIM) message to the destination node (node B). The destination node B can respond to the RTS message only when it is in the awake state. At step 610, the sending node A determines whether it has received a clear to send (CTS) message from the destination node B.

If a CTS message was received on the first attempt by the sending node A, at step 612 the sending node transmits the data to the destination node B, and at step 699, the method 600 ends. Otherwise, if the sending node A has not received a CTS message from the destination node B, the method 600 resends the CTS message for a predetermined number of times.

Specifically, at step 614, the sending node A increments the Nretry counter by one (1), and at step 616 a determination is made whether the count in the counter Nretry exceeds a predetermined count threshold (ThNretry). If the sending node A has not resent the RTS message more than the predetermined count threshold ThNretry, then the method returns to step 604 through 616, such that the sending node A may send the RTS message again. Once repeated attempts to send the RTS message have been made and the count threshold ThNretry has been exceeded at step 616, the sending node A assumes that the destination node B is in the sleep state, and suspends the RTS messages to the destination node B.

The method 600 then proceeds to step 618, where the sending node A waits until the destination node B is in its awake state (i.e., the m-slot of node B). The method 600 then proceeds to steps 604 through 616 to send the RTS message to the destination node B only at those times when the destination node B is in its awake state. Once the destination node B responds to the RTS message by sending a CTS message to the sending node A, then at step 612, the sending node A knows that the destination node B is in an awake state and then transmits the data to node B, without waiting for the m-marked slots. Additionally, if the sending node A has data bound for other m-nodes, the sending node A can improve efficiency by sending traffic indicator map (TIM) messages for those m-nodes when transmitting in slot m. The TIM message prevents these other m-nodes from transitioning into the sleep state.

The method 600 of FIG. 6 also accommodates instances where the destination node B moves out of its current cluster, yet may still be within the transmission range of the sending node A. In such instances, the destination node B may not hear the RTS/TIM messages due to its differently synchronized sleeping pattern. Optional step 620 allows the sending node A to verify destination node B's membership in node A's cluster, thereby avoiding excessive RTS transmissions.

Specifically, at step 620, the sending node A queries whether the destination node has changed clusters. If the query is negative (i.e., node A and node B are members of the same cluster), then the method 600 proceeds to step 618, as discussed above. Otherwise, if the query is affirmatively answered (i.e., node B is in a different cluster than node A), then at step 622, the sending node A obtains timing information for the destination node B via node A's cluster-head associated with the destination node. In this instance, the cluster-heads of each cluster must share such synchronized information.

In an alternative embodiment, at step 622, the sending node A may acquire a new route to the destination node B. Such alternate route may include using different hops between the nodes therebetween to send the data. Accordingly, sending information along a different routing path is subject to the various network conditions, such as the number of hops required, bandwidth capacity between the nodes, traffic flows, among other conventionally known network conditions.

The cluster based load adaptive sleeping protocol of the present invention combines several unique features. Specifically, there is no explicit need for synchronization between the nodes, and the node sleep patterns may be modified based on traffic load conditions. Further, there is no explicit exchange of information about sleep pattern between the nodes. Thus, battery life of a node may be further preserved, since the node does not have to transition into the awake (active) state to communicate information there between.

The inventive sleeping protocols described herein help improve battery life of a node operating under stable and changing network environments. For example, in networks where node speeds are highly mobile, the topology of the network changes often. Thus, the nodes need to remain in an active state for longer periods of time to update routing and neighbor node information. Conversely, where the node mobility is low, the nodes can remain in the sleep state for extended periods, provided there is no data destined for them. The sleeping protocols described herein are adaptive in that they may accommodate such various network conditions base on traffic load.

Although various embodiments that incorporate the teachings of the present invention have been shown and described in detail herein, those skilled in the art can readily devise many other varied embodiments that still incorporate these teachings.

What is claimed is:

1. A clustering based load adaptive sleeping protocol for ad hoc networks, comprising:
   a beacon signal originating from a cluster-head of a cluster, said beacon signal comprising a plurality of sequential beacon intervals, said beacon intervals each comprises a plurality of time slots associated with groups of nodes in said cluster;
   wherein said groups of nodes are defined by node_id modulo n, where node id represents a unique host identification of each node, and n is an integer representing a number of groups in said cluster;
   wherein said time slots are sequentially numbered zero to n−1;
   wherein each said beacon interval comprises at least one sequence of time slots numbered zero to n−1; and
   wherein one of said n time slots represents an epoch when a node is in an awake state, and n−1 time slots represent an epoch when said node is in a sleep state.

2. The sleeping protocol of claim 1, wherein each node is in an awake state during a time slot "m" corresponding to said node's assigned group number such that m=n.

3. The sleeping protocol of claim 2, wherein said node is in said sleep state during time slots occurring at (m+1) inodulo n.

4. A method of adapting a sleeping protocol of a node based on traffic patterns of said node, said node being associated with a cluster having a plurality of groups of nodes including a cluster-head node for providing a beacon signal, said method comprising:
  sequentially transitioning between an awake state and a sleep state of operation according to the beacon signal;
  determining whether said node has received at least one message from another node for a plurality of transition cycles between said awake state and sleep state; and
  extending said sleep state for each successive transition cycle, in an instance where no messages are received during a previous transition cycle, further comprising:
  incrementing a counter each time said node cycles between said awake and asleep states of operation;
  comparing said count to a predetermined count threshold; and
  extending said sleep state for each successive transition cycle, in an instance where said count exceeds said predetermined count threshold and no messages are received during a previous transition cycle.

5. The method of claim 4, wherein said at least one message comprises at least one of a request to send (RTS) and a traffic indication map (TIM).

6. The method of claim 4, wherein said sequentially transitioning between said awake state and said sleep state of operation comprises:
  providing said beacon signal with a plurality of sequential beacon intervals, wherein said beacon intervals each comprises a plurality of time slots associated with said plurality of groups of nodes in said cluster.

7. The sleeping protocol of claim 6, wherein said groups of nodes are defined by node_id modulo n, where node_id is a unique host identification of each node, and n is a number of groups formed in said cluster.

8. The sleeping protocol of claim 7, wherein said time slots are sequentially numbered zero to n−1.

9. The sleeping protocol of claim 8, wherein each said beacon interval comprises at least one sequence of time slots numbered zero to n−1.

10. The sleeping protocol of claim 9, wherein one of said n time slots represents an epoch when a node is in an awake state, and n−1 time slots represent an epoch when said node is in a sleep state.

11. The sleeping protocol of claim 10, wherein each node is in an awake state during a time slot "m" corresponding to said node's assigned group number such that m=n.

12. The sleeping protocol of claim 11, wherein said node is in said sleep state during time slots occurring at (m+1) modulo n.

13. The method of claim 6, further comprising:
  counting said plurality of sequential beacon intervals; and
  transitioning said node from an extended sleep state to an awake state, in an instance where said plurality of sequential beacon intervals exceeds a predetermined threshold.

14. A method of synchronizing a node moving from a first cluster to a second cluster, said node having a sleeping protocol, the method comprising:
  receiving, during an awake state of operation, a first beacon signal originating from a first cluster-head respectively associated with said first cluster, said beacon signal comprising a plurality of sequential beacon intervals, wherein said beacon intervals each comprises a plurality of time slots associated with groups of nodes in said first cluster;
  sequentially transitioning between an awake state and a sleep state of operation associated with said first beacon signal;
  during a subsequent awake state of operation, receiving a second beacon signal originates from said second cluster;
  recording information associated with said second beacon signal;
  staying in said awake state for a period exceeding a beacon interval of said second beacon signal; and
  synchronizing with said second beacon signal of said second cluster.

15. The method of claim 14, further comprising: sequentially transitioning between an awake state and a sleep state of operation associated with said second beacon signal.

16. The method of claim 15, wherein said node is out of range for receiving said first beacon signal.

17. The method of claim 15, wherein said node returns to said sleeping state in an instance where said second beacon signal is not received during an awake state of operation.

18. A method of transferring data from a first node to a second node, at least one of the two nodes having a sleeping protocol, the method comprising:
  transitioning said first node to an active state of operation;
  setting a message count clock to zero;
  sending a message from said first node to said second node;
  in an instance where said second node does not send an acknowledgement message, repeating said message a number of times until a message sent threshold has been exceeded;
  determining when said second node is in an awake mode; and
  sending said message from said first node to said second node in an instance where said second node is in said awake mode.

19. The method of claim 18, wherein said message comprises a request to send (RTS) message and said acknowledgement message comprises a clear to send (CTS) message.

20. The method of claim 18, wherein said message is a traffic indication message (TIM).

21. The method of claim 18, further comprising:
  determining whether said second node has changed from a first cluster to a second cluster; and
  obtaining timing information for said second node in an instance where said second node changed clusters.

22. The method of claim 21, wherein said obtaining timing information comprises:
  sending said timing information from a cluster-head associated with said second cluster to a cluster-head associated with said first cluster.

23. The method of claim 18, further comprising:
  determining whether said second node has changed from a first cluster to a second cluster; and
  obtaining routing information for said second node in an instance where said second node changed clusters.

* * * * *